United States Patent [19]
Flider

[11] 3,964,728
[45] June 22, 1976

[54] SELF CLOSING SAFETY GATE VALVE FOR VISCOUS FLUIDS

[75] Inventor: Frank S. Flider, Chicago, Ill.

[73] Assignee: Justrite Manufacturing Company, Chicago, Ill.

[22] Filed: July 22, 1974

[21] Appl. No.: 490,685

[52] U.S. Cl. ............................. 251/183; 137/377; 251/310; 251/313
[51] Int. Cl.² .......................................... F16K 25/00
[58] Field of Search ............ 137/377, 385; 251/180, 251/181, 183, 185, 310, 313

[56] References Cited
UNITED STATES PATENTS

| | | | |
|---|---|---|---|
| 1,179,387 | 4/1916 | Anschutz | 251/310 X |
| 1,267,489 | 5/1918 | Wray | 251/181 X |
| 2,391,278 | 12/1945 | Stark | 251/183 X |
| 2,566,071 | 8/1951 | Schobert | 251/310 X |
| 2,893,683 | 7/1959 | Lane | 251/180 |
| 2,979,076 | 4/1961 | Kish | 137/385 X |
| 3,212,752 | 10/1965 | Kast | 251/180 X |
| 3,353,785 | 11/1967 | Eggers | 251/310 X |
| 3,863,662 | 2/1975 | Zehr | 137/377 |

*Primary Examiner*—Harold W. Weakley
*Attorney, Agent, or Firm*—Alter and Weiss

[57] ABSTRACT

A self closing safety gate valve controls the flow of heavy, viscous fluids such as machine oil, rubber cement, lacquer, or the like. The valve housing contains a rotor with a spring biased thrust exerted laterally against the rotor, to hold it—in normal position—against the housing wall with a metal-to-metal seal at the output orifice. When the rotor turns, a pair of large output orifice openings, in the housing and rotor, are aligned—in off-normal position—in order to enable the out flow of fluid. A spring biased handle automatically returns the rotor from the off-normal to the normal position, where the thrust again presses the rotor body against the large output orifice opening in the housing.

1 Claim, 4 Drawing Figures

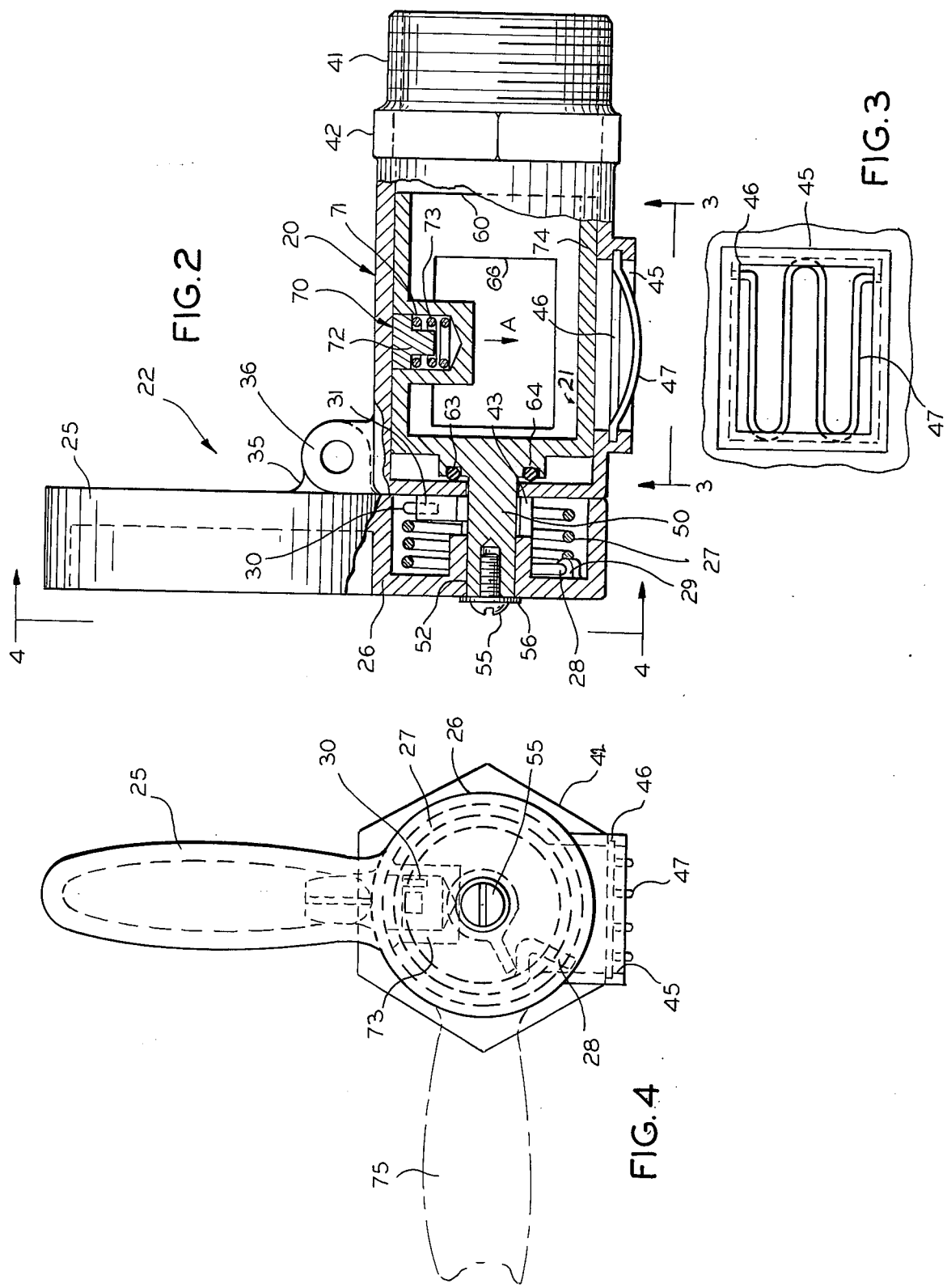

SELF CLOSING SAFETY GATE VALVE FOR VISCOUS FLUIDS

This invention relates to valves for heavy and viscous fluids and more particularly to self closing safety valves from such heavy and viscous fluids.

Viscous fluids of the type considered herein may take any of many forms. However, to illustrate the type of fluid being considered, it includes such things as heavy machine oil, rubber cement, lacquer, paint, and the like.

It is desirable that the heavy fluid be readily available, as by the turn of a valve handle, for example. On the other hand, it is also desirable to be able to shut off the flow of fluid quickly and easily. This means that the safety valve should be self closing so that flow stops automatically even if the user forgets to return the valve to its normal position. It should additionally provide means for locking the valve in a closed position as well as a release opening finger guard.

In the past, automatically closing valves have tended to be gravity operated. For example, the valve control arm has sometimes been a weighted lever which is lifted to enable flow and lowered to terminate flow. Therefore, when the arm is released, its weight automatically causes the valve to close. However, such an arrangement has had numerous drawbacks.

Accordingly, an object of the invention is to provide new and improved viscous fluid valves which open manually and close automatically, when released. Here an object is to provide a positively acting valve which closes quickly and resists dripping. In particular, an object is to provide an automatically closing rotary valve, of the described type.

Another object of the invention is to provide a safety valve with a very large port to enable a free flow of heavy and viscous fluids which tends to flow with a bulky response. Here an object is to provide a means for reliably and safely sealing off the flow of such fluid when a valve handle is released.

Yet another object of the invention is to provide valves of the described type which may be made at a very low cost, while retaining the necessary safety features of automatic shut-off, locking ability, and release opening guarding.

In keeping with an aspect of this invention, these and other objects are accomplished by a self closing gate valve having a housing containing a rotor with a spring biased thrust exerting means acting laterally against the rotor, perpendicular to the axis thereof. A pair of large output orifices or release openings in the housing and rotor, respectively, may be aligned by turning the rotor, in order to enable a flow of the heavy fluid. When a spring biased handle is released, the rotor automatically returns to a normal position, where the thrust means again presses the rotor body against the large opening in the housing.

The nature of a preferred embodiment of the invention may be understood best from a study of the attached drawing wherein:

FIG. 2 is a vertical cross sectional view of the assembled valve;

FIG. 3 is a plan view of a finger guard, looking upwardly along line 3—3 of FIG. 2; and FIG. 4 is an end elevation view of the valve handle viewed along line 4—4 of FIG. 2.

Figure 1:
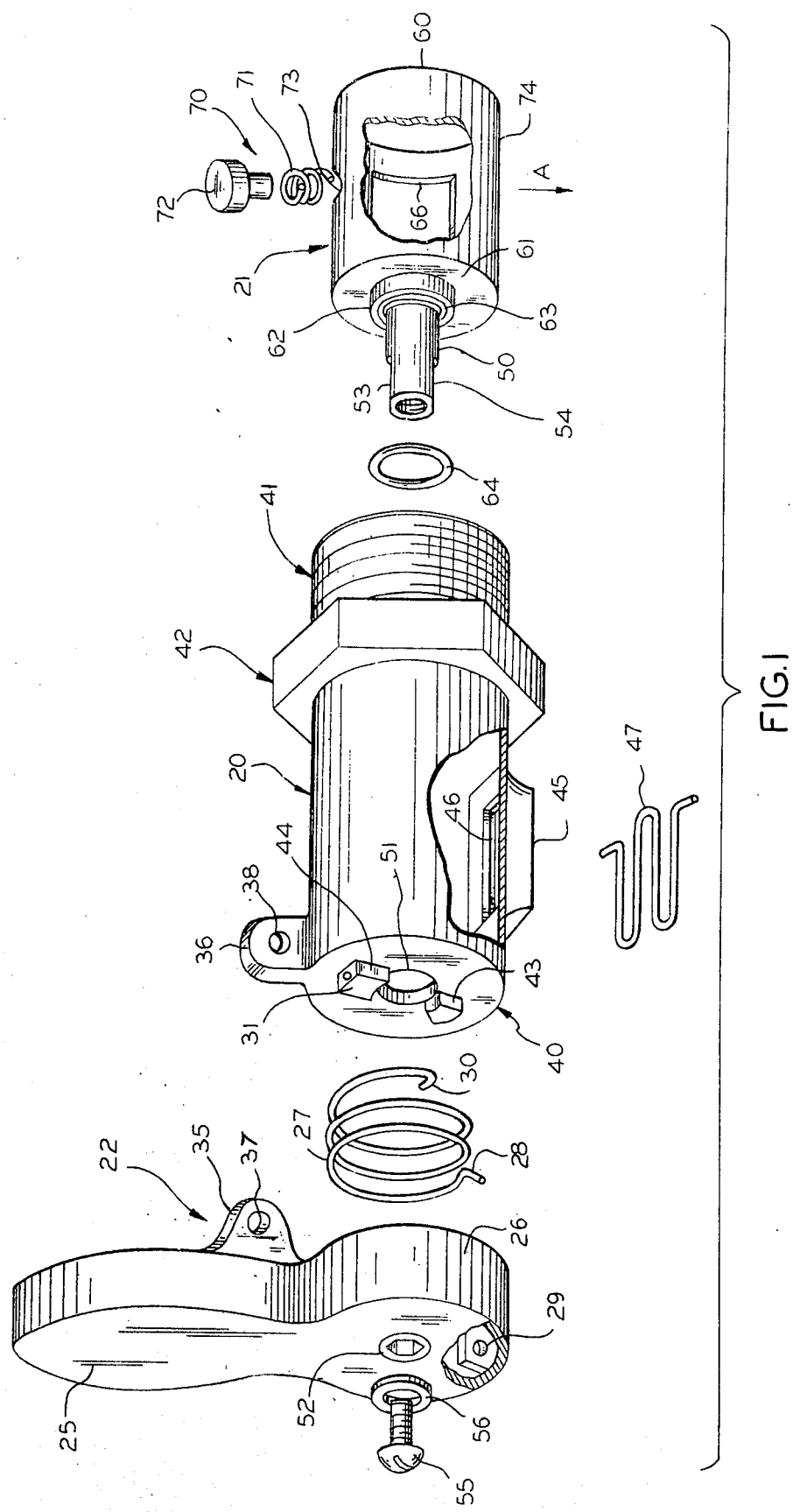
FIG. 1 is an exploded view of the inventive viscous fluid safety gate valve.

The major components of the inventive valve are a valve housing 20, a rotor 21, and a spring biased valve handle assembly 22. The rotor 21 fits snuggly, but rotatably, within the housing 20. The handle assembly 22 is connected to a shaft on the rotor 21 and adapted to turn it through approximately a quarter to half turn, between off-normal open and normal closed positions.

The handle assembly 22 includes a unitary handle 25 and cup 26 which may be cast in a single molding process step. Of course, assembly 22 could also be fabricated in any other suitable manner. The cup 26 includes a coiled spring 27 shaped and dimensioned to fit therein. One end 28 of spring 27 fits into and is captured by a tab keeper 29 formed within the cup. The other end 30 of the spring 27 fits into and is captured by a keeper 31 formed on the outer end of the housing 20. Therefore, the coiled spring 27 tends to hold the rotor at a normal closed position. When the handle assembly 22 is rotated off-normal, energy is stored in the spring 27. When the handle assembly 22 is released from the off-normal position, the tension in spring 27 positively drives the rotor 21 to a home position.

The handle 25 includes a locking tab 35 which strikes against a mating tab 36 integrally formed on the housing. Within the tabs 35, 36, a pair of aligned holes 37, 38 are formed, shaped and dimensioned to receive the shank or hasp of a lock for securing the valve in a closed position. When the valve is off-normal and the handle 25 is released, the energy stored in spring 27 slams the tab 35 against the tab 36, when the valve closes, thus safely and securely restraining handle 25 in a closed position.

The housing 20 is an elongated cylinder closed on one end 40 and open and threaded on the other end 41. A number of wrench faces 42 are formed on the housing, near the threaded end 41, so that the housing may be drawn in tightly against a pipe, oil drum, or the like. The end 40 includes a number of upstanding bosses which cooperate with the tab keeper 29 inside the handle assembly cup 26 to fix the open and shut limits of valve movement.

The bottom of housing 20 includes a large output orifice or opening 45 which provides an adequate clearance for enabling even the most bulky of fluids to flow out of the valve. A horizontal groove 46 is formed in the housing wall and around the inside perimeter of the opening 45. A spring 47 having a serpentine shape is dimensioned to snap into and be supported on four sides by the groove 46. This spring forms a guard for closing the release opening and keeping people from placing their fingers into the hole 45. Otherwise, they could be injured, or even lose a finger when the valve slams shut.

The rotor 21 is shaped and dimensioned to fit into the housing 20 and to be rotatably movable along and about an axis formed by integral shaft 50. Shaft 50 fits through hole 51 in the closed end 40 of housing 20. The handle assembly 22 includes a hole 52 in the center of cup 26, which hole fits over the end of the shaft 50. The end of the shaft 50 has flattened faces 53, 54 which key into corresponding flat faces in the hole 52. Additionally, the interior portion of shaft 50 is threaded enabling attachment of rotor 21 to handle assembly 22. Thus, when screw 55 is turned into place, over washer 56, the handle assembly 22 and rotor becomes united to turn as a unit.

The rotor 21 is a hollow cylinder, open at end 60 and closed on end 61. A bearing surface 62 is integrally formed on the closed end 61 of the rotor and arranged to be supported in the housing 20. An annular groove 63 is formed in the outside face of bearing surface 62 in order to receive an O-ring 64. When the screw 55 is tightened, the O-ring 64 is compressed against end 40 inside housing 20 sufficiently to preclude leakage of the heavy fluid. A hole 66 is formed in the side wall of rotor 21. When holes 45, 66 are aligned, the heavy fluid may flow into open rotor end 60 and out the release openings 45 and 66.

Thrust means 70 comprises a coiled spring 71 and a compression force applying button 72 which fit into a bore 73 formed perpendicularly in the wall of rotor 21 at a location opposite opening 45 when the rotor is in a normal closed position. The coiled spring 71 is compressed sufficiently to press the force applying button 72 outwardly from bore 73 and against the inner wall of housing 20. The opposite end of coiled spring 71 presses against the bottom of the bore 73, thereby urging the rotor in direction A in order to bring rotor side wall 74 into a more positive metal-to-metal sealing engagement with that portion of the housing 20 wall which surrounds opening 45. This spring closed seal helps prevent leakage.

The operation of the valve should now be apparent. In the normal position, the spring 27 holds rotor 21 in a closed valve position while spring 71 forces the valve opening into a more tightly metal-to-metal sealed position. When the valve handle 25 is turned to the off-normal position 75 (FIG. 4), the friction button 72 slides against the inside cylindrical surface of housing 20. Openings 45, 66 come into alignment and the heavy fluid flows. When the handle 25 is released, spring 27 drives the rotor 21 home, slamming tab 35 against tab 36.

Those who are skilled in the art will readily perceive how modifications may be made in the described structure without departing from the scope and the spirit of the invention. Therefore, the appended claims are to be construed to cover all equivalent structures.

I claim:

1. A valve for controlling the flow of heavy viscous fluids comprising, a main housing, said main housing having a cylindrical interior chamber with circular ends and side walls extending between said ends, an end housing opening at one of said ends, a housing release opening in the wall of said cylindrical housing, rotor means located within said main housing, said rotor being cylindrical and having circular ends and side walls extending between said ends, said rotor means being rotatable between a valve closed position and a valve open position to control the flow of the fluids as a function of the position of said rotor means, a first rotor opening at one end of said rotor means in communication with said end housing opening, a rotor release opening in the side wall of said rotor means, said rotor release opening and said housing release opening being aligned when said rotor is rotated to said open position with no portion of said rotor release opening and said housing release opening being aligned when said rotor is rotated to the closed position, thrust means for exerting a lateral force pushing said rotor means against said housing release opening when said rotor means is in the closed position to force the side walls of said rotor means against the housing release opening for effectively closing the valve, said thrust means comprising a spring loaded button compressed in a blind bore within said rotor means by the side wall of said housing, rotating means for rotating said rotor means from the normally closed position to align said housing release opening and said rotor release opening to enable the flow of said fluids though said valve, and said rotating means including spring biased safety handle means for controlling the rotation of said rotor means and for automatically returning the rotor means to the normally closed position where the thrust means presses the rotor body against the housing release opening thereby sealing said housing release opening.

* * * * *